(12) United States Patent
Chen et al.

(10) Patent No.: US 8,773,010 B2
(45) Date of Patent: Jul. 8, 2014

(54) DISPLAY DEVICE

(71) Applicant: AU Optronics Corp., Hsin-Chu (TW)

(72) Inventors: Kuei-Bai Chen, Hsin-Chu (TW);
Chia-Hao Li, Hsin-Chu (TW);
Chen-Hsien Liao, Hsin-Chu (TW)

(73) Assignee: AU Optronics Corp., Science-Based Industrial Park, Hsin-Chu (TW)

(*) Notice: Subject to any disclaimer, the term of this patent is extended or adjusted under 35 U.S.C. 154(b) by 0 days.

(21) Appl. No.: 13/933,136

(22) Filed: Jul. 2, 2013

(65) Prior Publication Data
US 2014/0140055 A1 May 22, 2014

(30) Foreign Application Priority Data

Nov. 20, 2012 (TW) .............. 101143240 A

(51) Int. Cl.
H01J 1/62 (2006.01)
F21K 99/00 (2010.01)
F21V 9/08 (2006.01)

(52) U.S. Cl.
CPC .... F21V 9/08 (2013.01); F21K 9/50 (2013.01)
USPC ......................... 313/501; 313/512

(58) Field of Classification Search
CPC .............. G02F 1/33603; G02F 1/1336; G02F 1/133602
USPC ................................. 313/498–512
See application file for complete search history.

(56) References Cited

U.S. PATENT DOCUMENTS

| 5,968,688 | A | 10/1999 | Masuda | |
|---|---|---|---|---|
| 6,713,227 | B2 | 3/2004 | Machiguchi | |
| 7,233,104 | B2 | 6/2007 | Kuma | |
| 2008/0143932 | A1 | 6/2008 | Cheng | |
| 2009/0135338 | A1* | 5/2009 | Wang et al. | 349/69 |
| 2011/0156575 | A1* | 6/2011 | Yu et al. | 313/503 |

FOREIGN PATENT DOCUMENTS

TW 201122653 7/2011
TW I347467 8/2011

* cited by examiner

Primary Examiner — Anne Hines
(74) Attorney, Agent, or Firm — Winston Hsu; Scott Margo

(57) ABSTRACT

A display device includes at least one light-emitting device and a patterned color filter layer. The light-emitting device is used to provide a white light having a white point chromaticity coordinate (Wx, Wy) where $0.23<Wx<0.27$, $0.22<Wy<0.25$. The patterned color filter layer includes a red color filter, a green color filter and a blue color filter. Peaks of transmittance spectrums of the red color filter, the green color filter, and the blue color filter are respectively between 720 nm and 780 nm, between $534\pm2$ nm, and between $449\pm2$ nm. Intensities of the peaks of the transmittance spectrums of the red color filter, the green color filter, and the blue color filter are respectively between 0.95 and 1, between 0.88 and 0.91, and between 0.83 and 0.87.

11 Claims, 10 Drawing Sheets

DISPLAY DEVICE

BACKGROUND OF THE INVENTION

1. Field of the Invention

The present invention relates to a display device, and more particularly, to a display device capable of providing images with a color gamut covering more than 99% of the standard RGB (sRGB) color gamut.

2. Description of the Prior Art

Color gamut is a way to judge ability of a display device to provide images in different colors. Standard RGB (sRGB) color gamut specification, approved as a formal international standard by the International Electrotechnical Commission (IEC), and adobe color gamut specification created by adobe are most common color gamut. Better color reproduction of a display device may be achieved when a color gamut coverage of the display device gets higher. For a liquid crystal display device, presented colors are mainly dominated by matching conditions of light source spectrums and transmittance spectrums of color filters. Demands on larger color gamut of the display device are increased since the display devices are not limited to be applied for monitors and televisions recently. How to enhance the color gamut of the display device has been a major problem in the related display industries.

SUMMARY OF THE INVENTION

One of the objectives of the present invention is to provide a display device with high color reproduction.

To achieve the purposes described above, an embodiment of the present invention provides a display device. The display device includes at least one light-emitting device and a patterned color filter layer. The light-emitting device is configured to provide a white light having a white point chromaticity coordinate (Wx, Wy) where $0.23<Wx<0.27$, and $0.22<Wy<0.25$. The patterned color filter layer includes a red color filter, a green color filter, and a blue color filter. The red color filter is configured to covert the white light into a red light after the white light passes through the red color filter. A peak of a transmittance spectrum of the red color filter is between 720 nanometers (nm) and 780 nm, and an intensity of the peak of the transmittance spectrum of the red color filter is between 0.95 and 1. The green color filter is configured to covert the white light into a green light after the white light passes through the green color filter. A peak of a transmittance spectrum of the green color filter is between 534±2 nm, and an intensity of the peak of the transmittance spectrum of the green color filter is between 0.88 and 0.91. The blue color filter is configured to covert the white light into a blue light after the white light passes through the blue color filter. A peak of a transmittance spectrum of the blue color filter is between 449±2 nm, and an intensity of the peak of the transmittance spectrum of the blue color filter is between 0.83 and 0.87.

In the display device of the present invention, the color filters under the specifications described above are used to cooperate with the light-emitting device defined above. The display device may be capable of providing images with a color gamut covering more than 99% of the sRGB color gamut accordingly, and the color reproduction of the display device may be enhanced.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to users skilled in the technology of the present invention, embodiments are detailed as follows. The embodiments of the present invention are illustrated in the accompanying drawings with numbered elements to clarify the contents and effects to be achieved.

Figure 1:
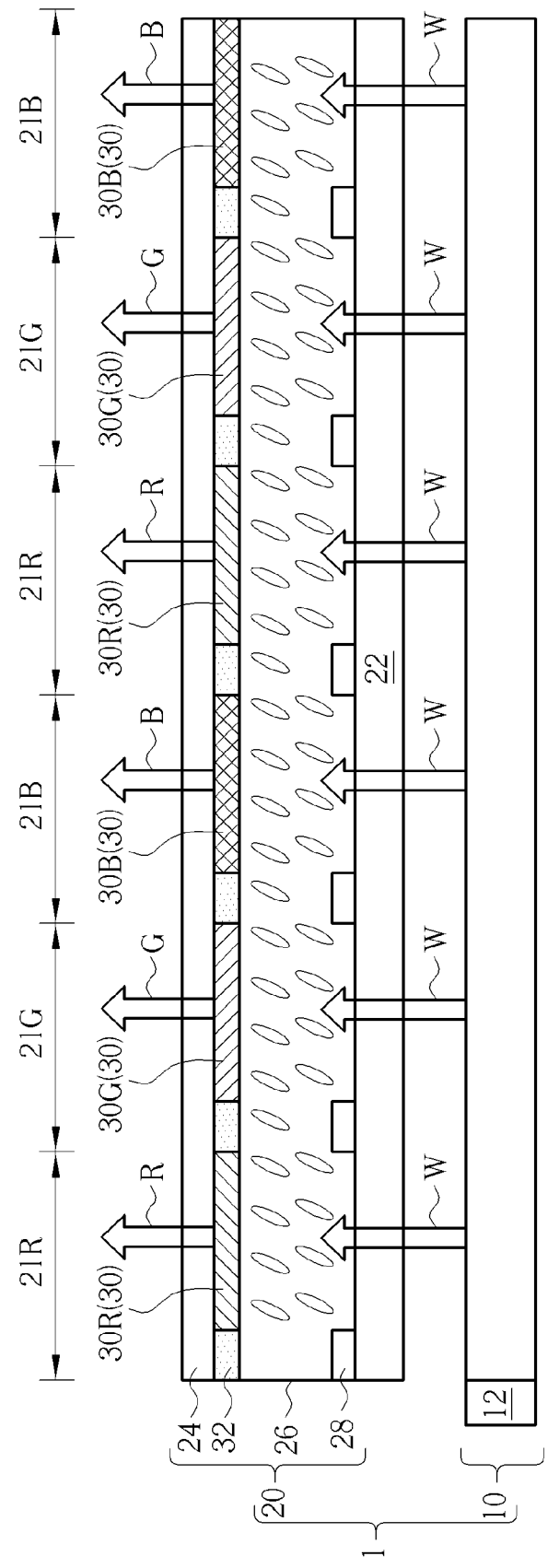
FIG. 1 is a schematic diagram illustrating a display device of the present invention.

Please refer to FIG. 1. FIG. 1 is a schematic diagram illustrating a display device of the present invention. In this embodiment, the display device is a non-self-luminous display device, such as a liquid crystal display device, but not limited thereto. The display device in this embodiment may also be other appropriate display devices. As shown in FIG. 1, a display device 1 in this embodiment includes a backlight module 10 and a display panel 20. The backlight module 10 is disposed under the display panel 20, and the backlight module 10 includes at least one light-emitting device 12 configured to provide a white light W to the display panel 20. The white light W has a white point chromaticity coordinate (Wx, Wy) where Wx and Wy may be substantially allocated within following ranges: $0.23<Wx<0.27$, and $0.22<Wy<0.25$. The display panel 20 in this embodiment is a non-self-luminous display panel such as a liquid crystal display panel, but not limited thereto. In this embodiment, the display panel 20 includes an array substrate 22, a counter substrate 24, a plurality of red sub-pixels 21R, a plurality of green sub-pixels 21G, a plurality of blue sub-pixels 21B, a display medium layer 26, a plurality of active switching units 28, a patterned color filter layer 30, and a light-shielding pattern 32. The array substrate 22 and the counter substrate 24 are disposed oppositely to each other. The display medium layer 26, such as a liquid crystal layer, is disposed between the array substrate 22 and the counter substrate 24. The active switching unit 28 may be a thin film transistor, and the active switching units 28 are disposed on the array substrate 22. The display panel 20 may include a plurality of the active switching units 28 respectively disposed in each red sub-pixel 21R, each green sub-pixel 21G, and each blue sub-pixel 21B. The pattern color filter layer 30 and the light-shielding layer 32 are disposed on the counter substrate 24. In another embodiment of the present invention, the pattern color filter layer 30 and the light-shielding layer 32 may also be disposed on the array substrate 22. The patterned color filter layer 30 includes a red color filter 30R disposed in the red sub-pixel 21R, a green color filter 30G disposed in the green sub-pixel 21G, and a blue color filter 30B disposed in the blue sub-pixel 21B. The red color filter 30R is configured to covert the white light W into a red light R after the white light W passes through the red color filter 30R. The green color filter 30G is configured to covert the white light W into a green light G after the white light W passes through the green color filter 30G. The blue color filter 30B is configured to covert the white light W into a blue light B after the white light W passes through the blue color filter 30B. The red light R, the green light G, and the blue light B irradiating from the patterned color filter layer 30 may be used to present full color display images. The light-shielding pattern 32, such as a black matrix, is disposed between adjacent color filter patterns so as to block light leakage. The display panel 20 may further include display units (not shown), such as gate lines, data lines, pixel electrodes, common electrodes, capacitance storage lines, capacitance storages, alignment films, and polarizing layers. The allocations and functions of the display units mentioned above are well-known to people with ordinary skills in the category of the present invention and will not be redundantly described.

In this embodiment, the white light W emitted from the light-emitting device 12 has a white point chromaticity coordinate (Wx, Wy) where Wx and Wy may be substantially allocated within following ranges: 0.23<Wx<0.27, and 0.22<Wy<0.25. Additionally, a spectrum of the white light W emitted from the light-emitting device 12 has three peaks. In other words, the spectrum of the white light W includes a blue light spectrum, a green light spectrum and a red light spectrum. A peak of the blue light spectrum is substantially between 442 nm and 446 nm, and a full width at half maximum (FWHM) of the peak of the blue light spectrum is substantially between 15 nm and 25 nm. A peak of the green light spectrum is substantially between 528 nm and 532 nm, and a FWHM of the peak of the green light spectrum is substantially between 65 nm and 85 nm. A peak of the red light spectrum is substantially between 628 nm and 632 nm, and a FWHM of the peak of the red light spectrum is substantially between 70 nm and 100 nm. The light-emitting device 12 includes a white light emitting diode (LED) device. The white LED device may include a blue LED chip and a plurality of yellow phosphor powders. The yellow phosphor powders may be used to convert a part of blue lights generated from the blue LED chip into yellow lights. The blue lights and the yellow lights may be mixed to form white lights. Materials of the yellow phosphor powders include a silicate base phosphor material. A crystal structure of the silicate base phosphor material is monoclinic, and a chemical formula of the silicate base phosphor material may be $M_2SiO_4$ where M may be alkaline earth metals such as calcium (Ca), strontium (Sr), and barium (Ba). Additionally, other elements such as europium (Eu), germanium (Ge), aluminium (Al) or phosphorus (P) may be doped into the silicate base phosphor material according to different considerations on wavelength, and the above elements may be used to replace some of the alkaline earth metals. For example, in this embodiment, the silicate base phosphor material includes a mixture of a europium-doped barium-strontium-silicate ($BaSrSiO_4:Eu^{2+}$) and a europium-doped strontium-lithium-silicate ($SrLi_2SiO_4:Eu^{2+}$). A concentration of the $BaSrSiO_4:Eu^{2+}$ in the mixture is substantially between 59% and 73%, and a concentration of the $SrLi_2SiO_4:Eu^{2+}$ in the mixture is substantially between 27% and 41%, but not limited thereto. In other embodiments of the present invention, a mixing ratio of the $BaSrSiO_4:Eu^{2+}$ to the $SrLi_2SiO_4:Eu^{2+}$ in the mixture may be further modified, or other materials may also be added into the mixture. In addition, the silicate base phosphor material in the yellow phosphor powders may be other appropriate materials or mixtures. The materials of the yellow phosphor powders may not be limited to silicate base phosphor materials, and other appropriate phosphor materials may also be applied in the yellow phosphor powders.

Figure 2:
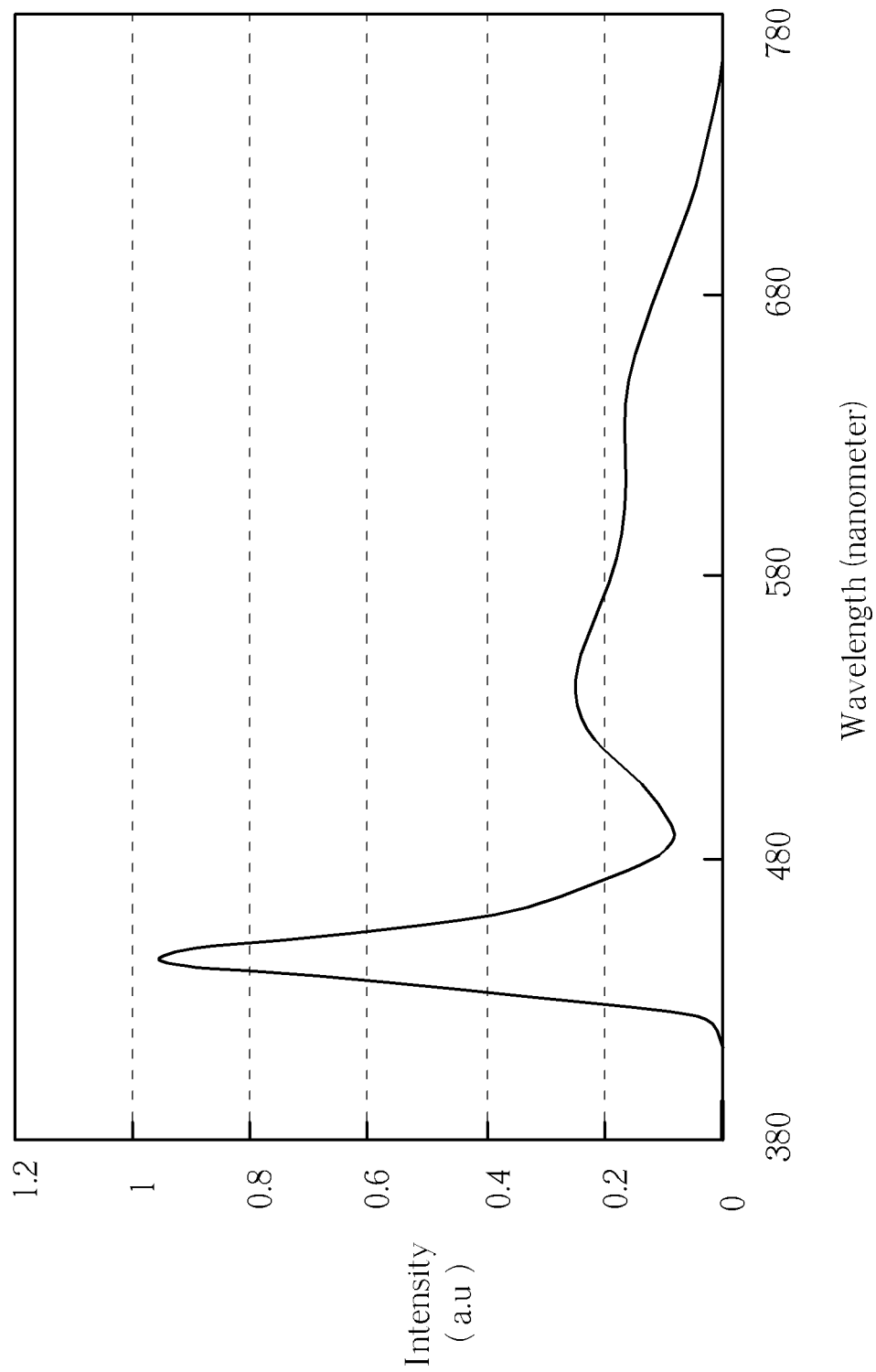
FIG. 2 is a schematic diagram illustrating a spectrum of a white light provided by a light-emitting device according to a sample 1 in this embodiment.
Figure 3:
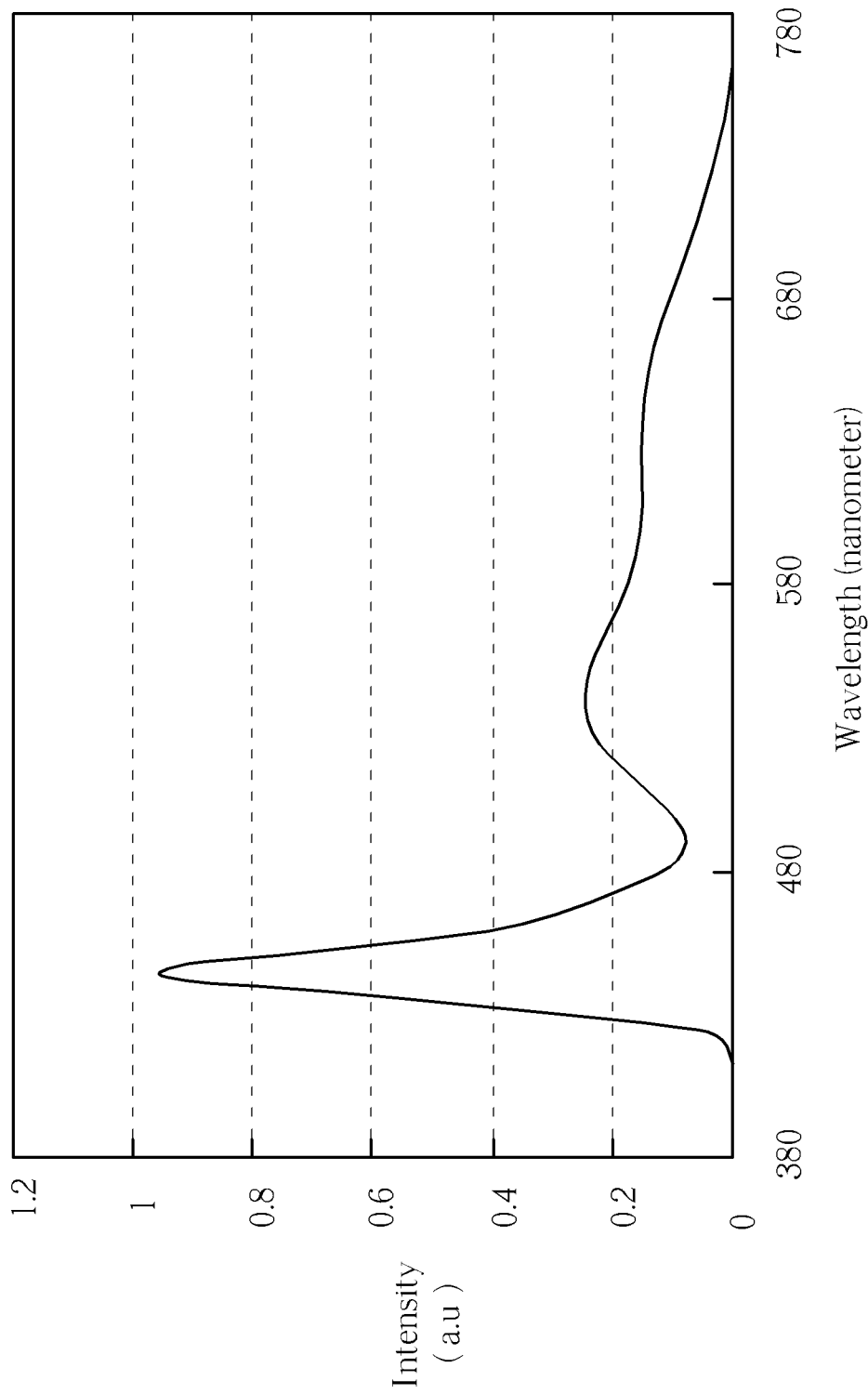
FIG. 3 is a schematic diagram illustrating a spectrum of a white light provided by a light-emitting device according to a sample 2 in this embodiment.
Figure 4:
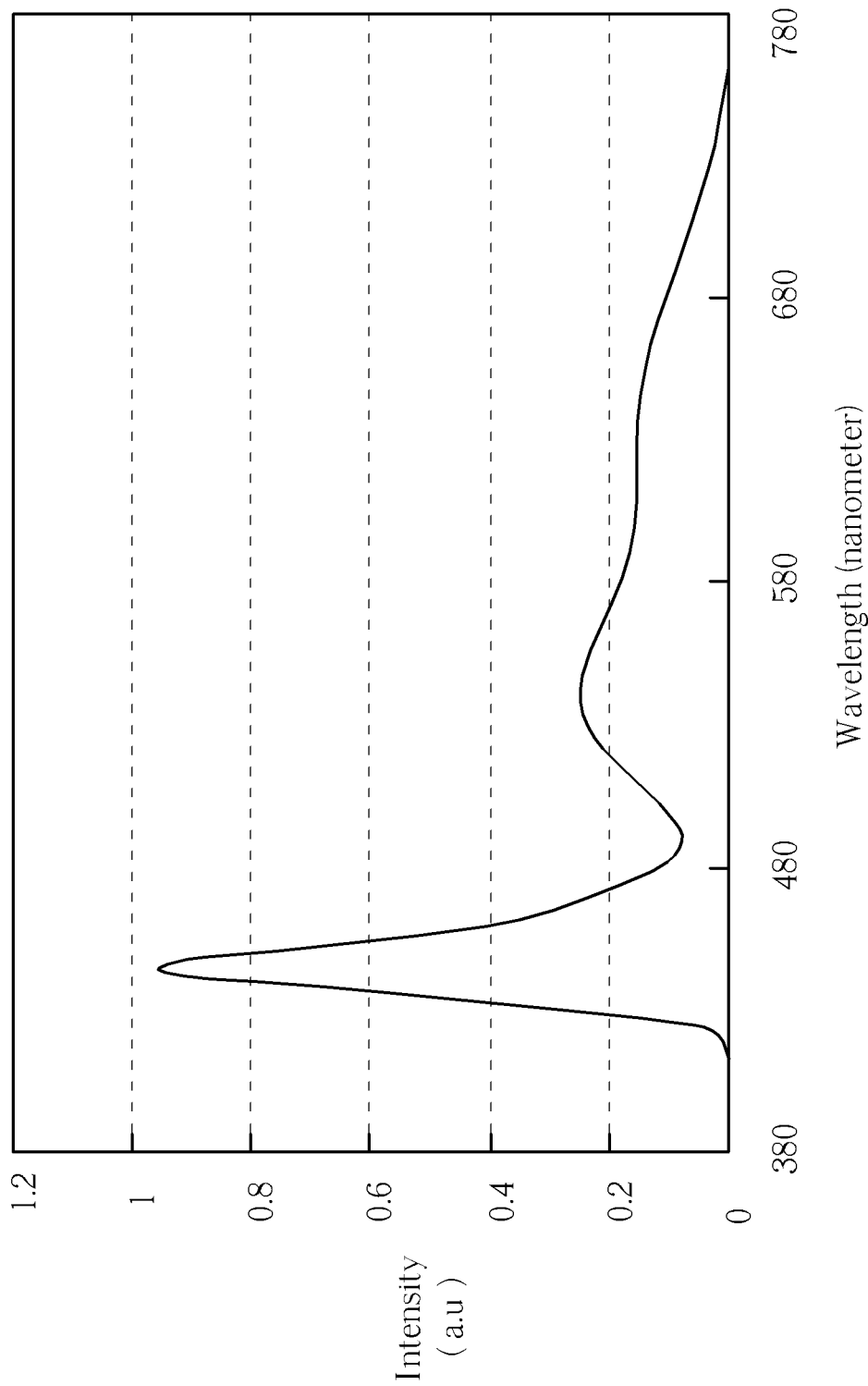
FIG. 4 is a schematic diagram illustrating a spectrum of a white light provided by a light-emitting device according to a sample 3 in this embodiment.
Figure 5:
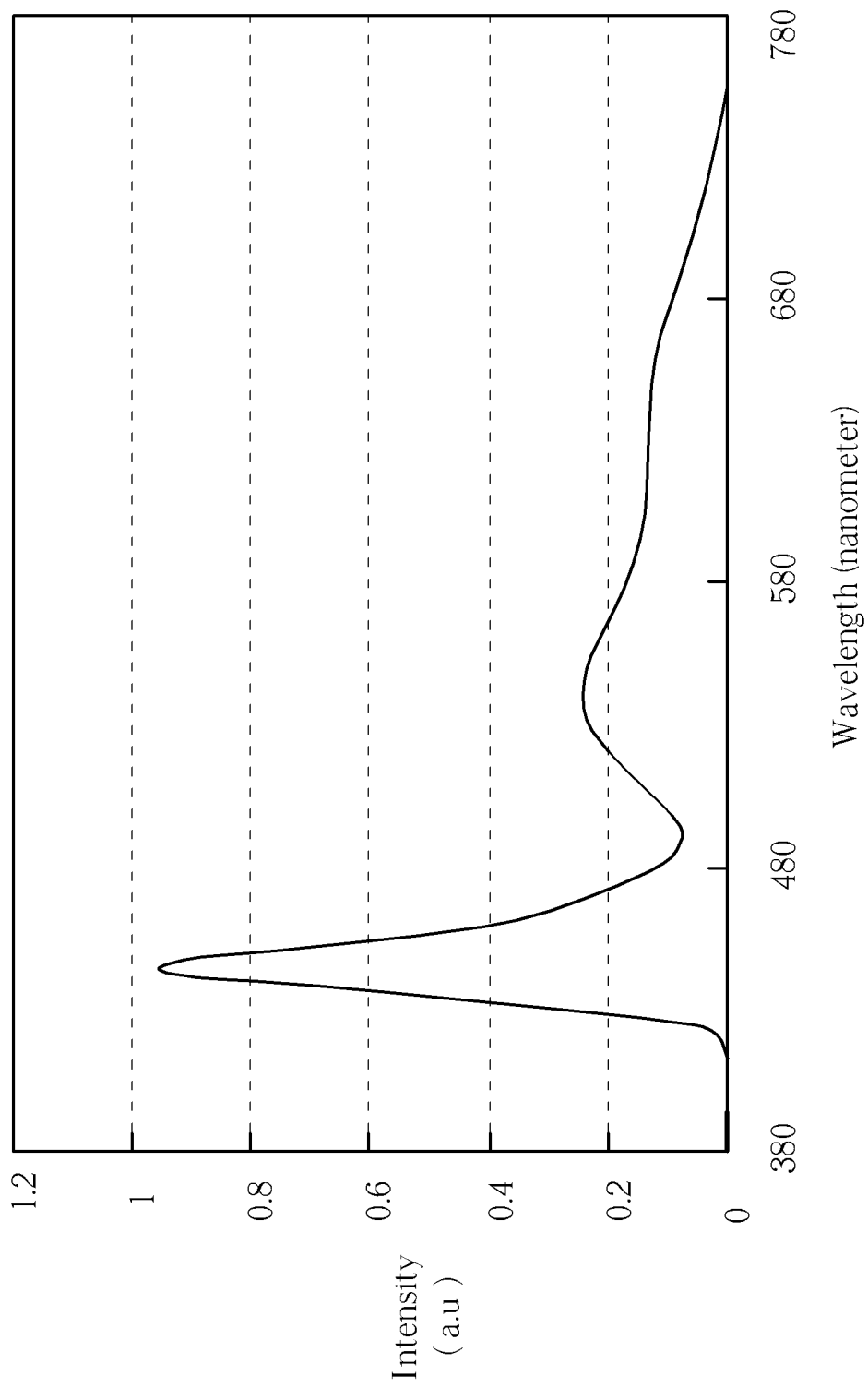
FIG. 5 is a schematic diagram illustrating a spectrum of a white light provided by a light-emitting device according to a sample 4 in this embodiment.
Figure 6:
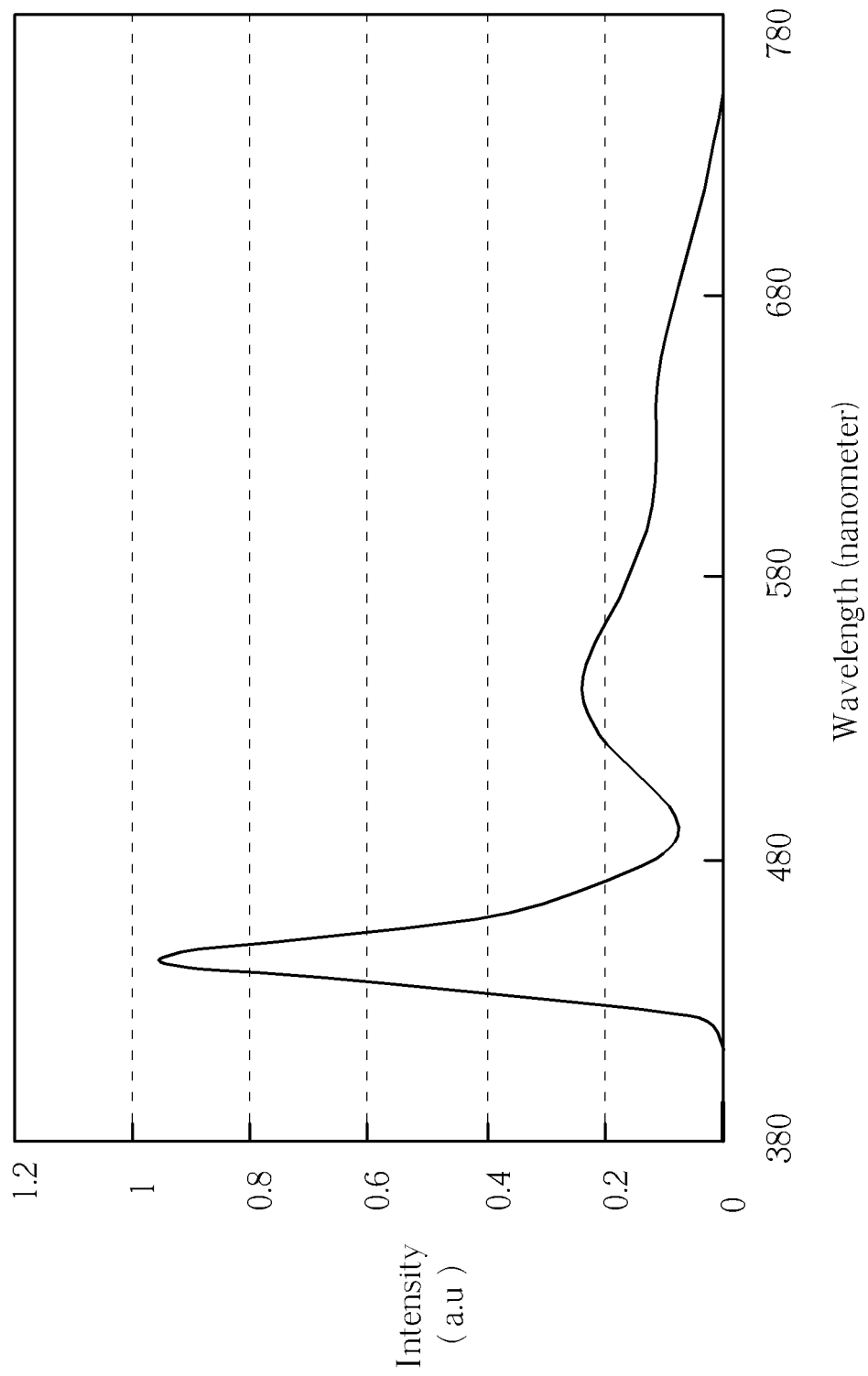
FIG. 6 is a schematic diagram illustrating a spectrum of a white light provided by a light-emitting device according to a sample 5 in this embodiment.
Figure 7:
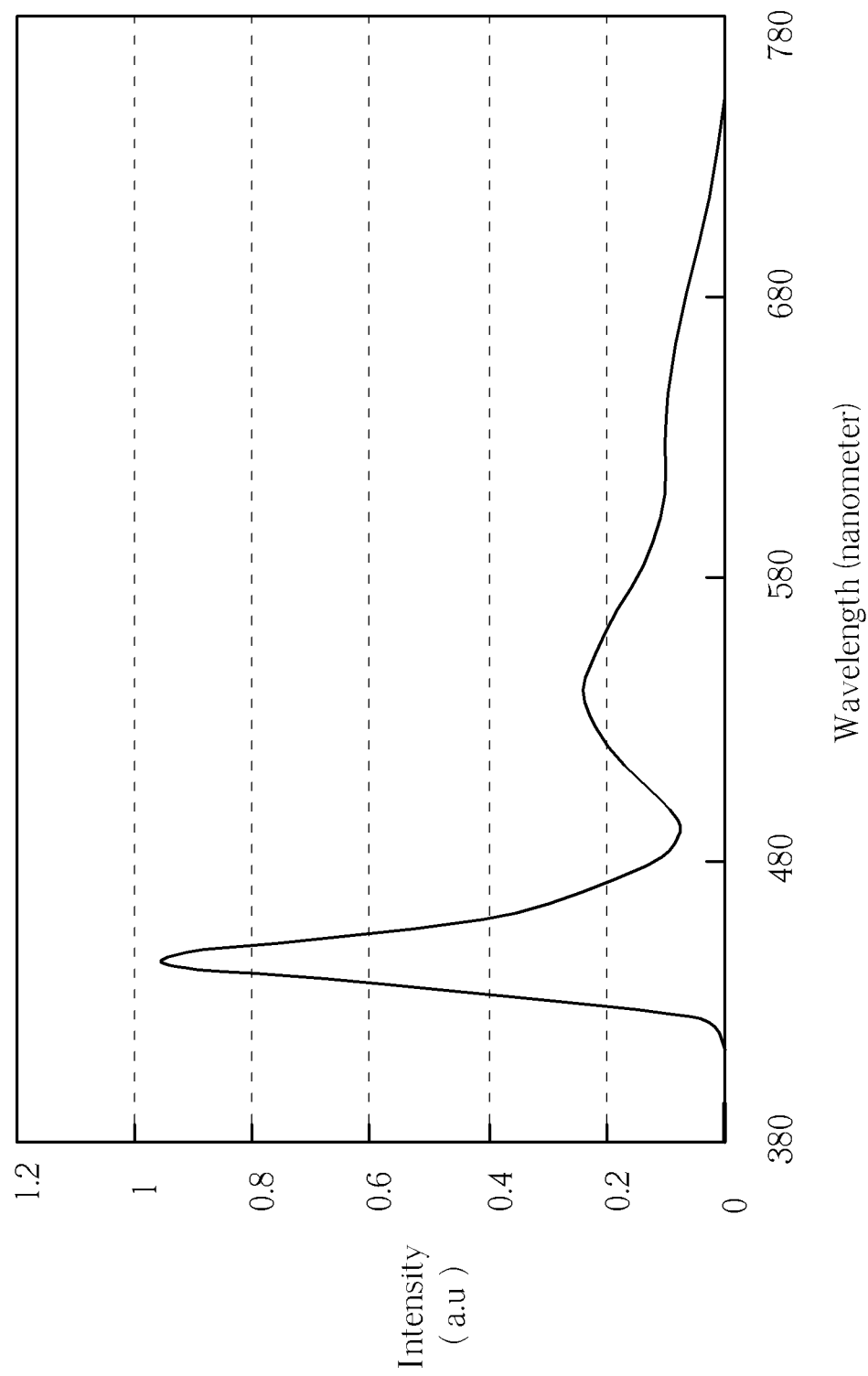
FIG. 7 is a schematic diagram illustrating a spectrum of a white light provided by a light-emitting device according to a sample 6 in this embodiment.
Figure 8:
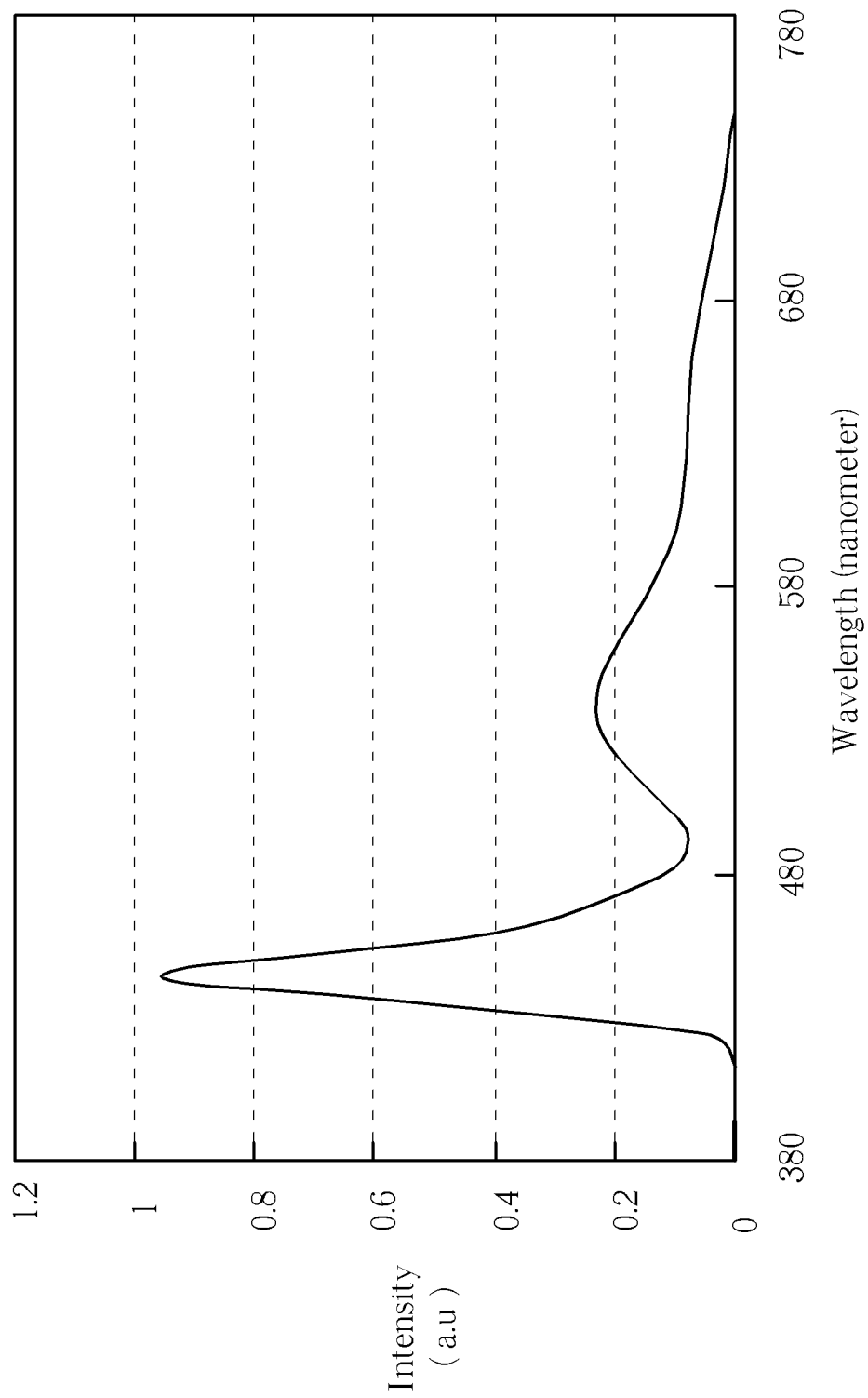
FIG. 8 is a schematic diagram illustrating a spectrum of a white light provided by a light-emitting device according to a sample 7 in this embodiment.
Figure 9:
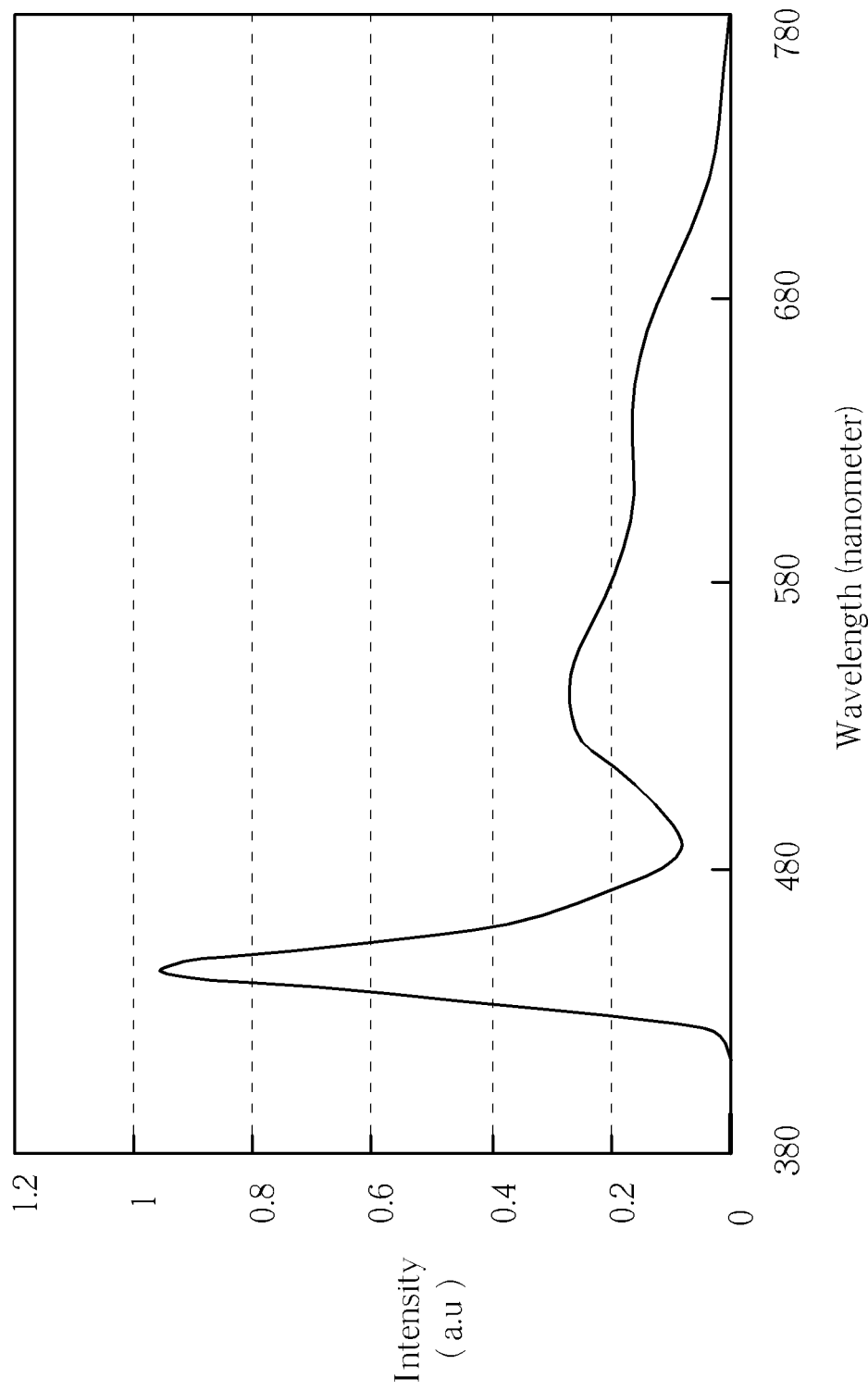
FIG. 9 is a schematic diagram illustrating a spectrum of a white light provided by a light-emitting device according to a sample 8 in this embodiment.

Please refer to Table 1 and FIGS. 2-9. Table 1 shows the relationship between the white point chromaticity coordinates of the white light from the light-emitting device and the concentrations of the silicate base phosphor materials in the yellow phosphor powders of the light-emitting device. FIG. 2 is a schematic diagram illustrating a spectrum of a white light provided by a light-emitting device according to a sample 1 in this embodiment. FIG. 3 is a schematic diagram illustrating a spectrum of a white light provided by a light-emitting device according to a sample 2 in this embodiment. FIG. 4 is a schematic diagram illustrating a spectrum of a white light provided by a light-emitting device according to a sample 3 in this embodiment. FIG. 5 is a schematic diagram illustrating a spectrum of a white light provided by a light-emitting device according to a sample 4 in this embodiment. FIG. 6 is a schematic diagram illustrating a spectrum of a white light provided by a light-emitting device according to a sample 5 in this embodiment. FIG. 7 is a schematic diagram illustrating a spectrum of a white light provided by a light-emitting device according to a sample 6 in this embodiment. FIG. 8 is a schematic diagram illustrating a spectrum of a white light provided by a light-emitting device according to a sample 7 in this embodiment. FIG. 9 is a schematic diagram illustrating a spectrum of a white light provided by a light-emitting device according to a sample 8 in this embodiment.

TABLE 1

| | white point chromaticity coordinates | | concentrations of silicate base phosphor materials | |
|---|---|---|---|---|
| | Wx | Wy | $BaSrSiO_4:Eu^{2+}$ | $SrLi_2SiO_4:Eu^{2+}$ |
| Sample 1 | 0.27 | 0.24 | 59.1% | 40.9% |
| Sample 2 | 0.26 | 0.24 | 61.0% | 39.0% |
| Sample 3 | 0.26 | 0.24 | 61.9% | 38.1% |
| Sample 4 | 0.25 | 0.23 | 65.0% | 35.0% |
| Sample 5 | 0.25 | 0.23 | 67.6% | 32.4% |
| Sample 6 | 0.24 | 0.22 | 69.4% | 30.6% |
| Sample 7 | 0.23 | 0.22 | 72.7% | 27.3% |
| Sample 8 | 0.27 | 0.25 | 60.9% | 39.1% |
| Sample a | 0.21 | 0.20 | 79.3% | 20.7% |
| Sample b | 0.22 | 0.21 | 77.4% | 22.6% |

In samples 1-8 and samples a-b, the silicate base phosphor material is a mixture of $BaSrSiO_4:Eu^{2+}$ and $SrLi_2SiO_4:Eu^{2+}$ prepared in different concentrations and ratios. According to the experiment results list in Table 1, the concentrations of the europium-doped barium-strontium-silicate in the mixtures of samples 1-8 ranges between 59% and 73%, and the concentrations of the europium-doped strontium-lithium-silicate in the mixtures of samples 1-8 ranges between 27% and 41% comparatively. Under the concentration ratio ranges described above, the white point chromaticity coordinates (Wx, Wy) of the white light emitted from the light-emitting device will be substantially allocated within following ranges: 0.23<Wx<0.27, and 0.22<Wy<0.25, and the white light source specification required in this embodiment may be achieved accordingly.

Figure 10:
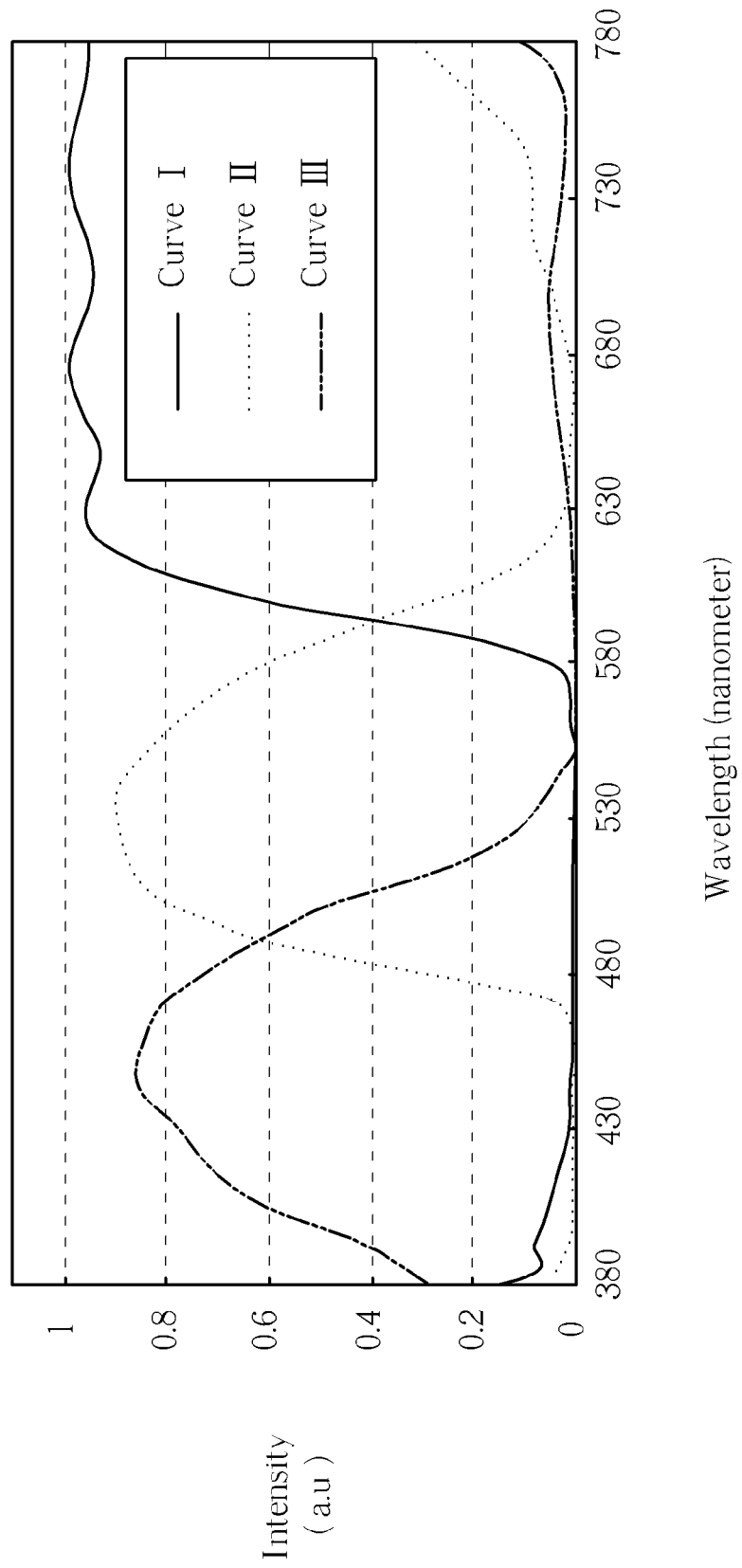
FIG. 10 is a schematic diagram illustrating a transmittance spectrum of a patterned color filter layer according to an embodiment of the present invention.

Please refer to FIG. 10 and FIG. 1. FIG. 10 is a schematic diagram illustrating a transmittance spectrum of a patterned color filter layer according to an embodiment of the present invention. As shown in FIG. 10, curve I shows a transmittance spectrum of the red color filter 30R. A peak of the transmittance spectrum of the red color filter 30R is substantially between 720 nanometers (nm) and 780 nm, and an intensity of the peak of the transmittance spectrum of the red color filter 30R is substantially between 0.95 and 1. Curve II shows a transmittance spectrum of the green color filter 30G. A peak of the transmittance spectrum of the green color filter 30G is between 534±2 nm, a full width at half maximum (FWHM) of the peak of the transmittance spectrum of the green color filter 30G is substantially between 102 nm and 106 nm, and an intensity of the peak of the transmittance spectrum of the green color filter 30G is between 0.88 and 0.91. Curve III shows a transmittance spectrum of the blue color filter 30B. A peak of the transmittance spectrum of the blue color filter 30B is between 449±2 nm, a FWHM of the peak of the transmittance spectrum of the blue color filter 30B is substantially between 108 nm and 113 nm, and an intensity of the peak of the transmittance spectrum of the blue color filter 30B is between 0.83 and 0.87.

In this embodiment, materials of the red color filter 30R may include a mixture of diketo-pyrrolopyrrole (DDP) series pigment (as shown in the chemical formula (1) listed below) and anthraquinone series pigment (as shown in the chemical formula (2) listed below), or the red color filter 30R may consist of a mixture of the DDP series pigment and the anthraquinone series pigment described above.

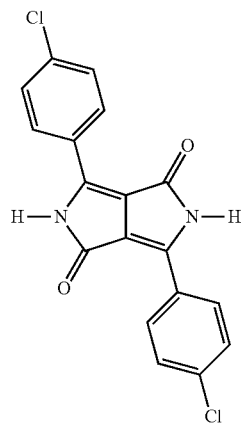

(1)

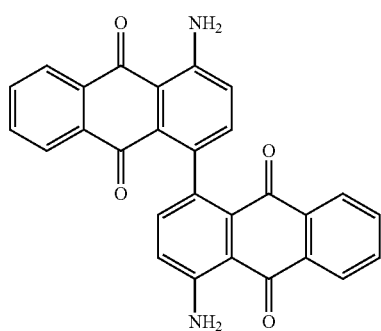

(2)

The materials of the red color filter 30R are not limited to the materials mentioned above, and any other materials for red color filtering may also be applied. A ratio of the DDP series pigment to the anthraquinone series pigment may be further modified according to other required red color filtering effects.

Materials of the green color filter 30G may include a mixture of halogen-phthalocyanine series pigment (as shown in the chemical formula (3) listed below) and azo series pigment (as shown in the chemical formula (4) listed below), or the green color filter 30G may consist of a mixture of the halogen-phthalocyanine series pigment and the azo series pigment described above.

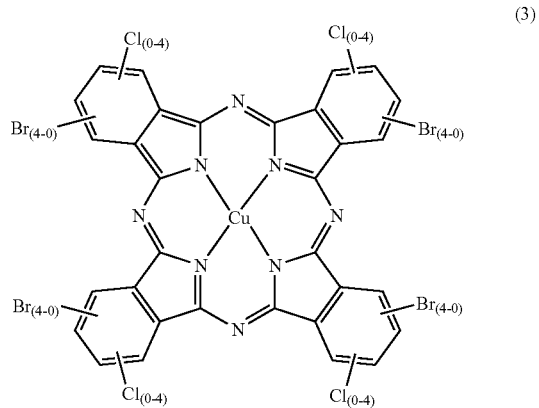

(3)

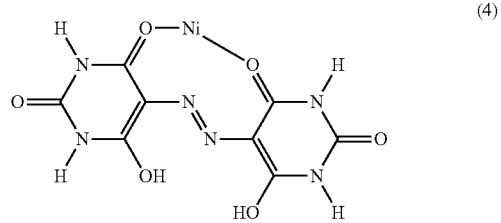

(4)

The materials of the green color filter 30G are not limited to the materials mentioned above, and any other materials for green color filtering may also be applied. A ratio of the halogen-phthalocyanine series pigment to the azo series pigment may be further modified according to other required green color filtering effects.

Materials of the blue color filter 30B may include a mixture of phthalocyanine series pigment (as shown in the chemical formula (5) listed below) and anthraquinone series dyes (as shown in the chemical formula (6) listed below), or the blue color filter 30B may consist of a mixture of the phthalocyanine series pigment and the anthraquinone series dyes described above.

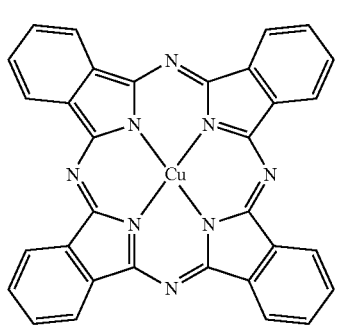

(5)

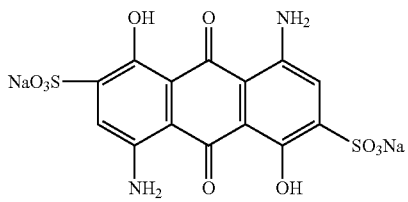

(6)

The materials of the blue color filter 30B are not limited to the materials mentioned above, and any other materials for blue color filtering may also be applied. A ratio of the phthalocyanine series pigment to the anthraquinone series dyes may be further modified according to other required blue color filtering effects.

Please refer to Table 2-1, Table 2-2, and Table 1. Table 2-1 and Table 2-2 show chromaticity coordinates of red, chromaticity coordinates of green, chromaticity coordinates of blue, whit point chromaticity coordinates, NTSC color gamut coverage, and standard RGB (sRGB) color gamut coverage of display images provided by the display device of this embodiment. In sRGB color gamut specification, which is approved as a formal international standard by the International Electrotechnical Commission (IEC), the chromaticity coordinates of red, green, and blue are (0.64, 0.33), (0.3, 0.6), and (0.15, 0.06), respectively. The white point chromaticity coordinates (Wx, Wy) of the white light emitted from the light-emitting device of samples 1-8 are allocated within following ranges: $0.23<Wx<0.27$, and $0.22<Wy<0.25$ (as shown in Table 1). Accordingly, the sRGB color gamut coverage of the display images provided by the display device of samples 1-8 may be higher than 99% (as shown in Table 2-2). On the other side, the white point chromaticity coordinates (Wx, Wy) of the white light emitted from the light-emitting device of samples a-b are not allocated within the ranges described above (as shown in Table 1), and the sRGB color gamut coverage of the display images provided by the display device of samples a-b are below 99% (as shown in Table 2-2).

TABLE 2-1

| | chromaticity coordinates of red | | | chromaticity coordinates of green | | |
|---|---|---|---|---|---|---|
| | x | y | Y | x | y | Y |
| Sample 1 | 0.651 | 0.325 | 3.36 | 0.304 | 0.630 | 14.50 |
| Sample 2 | 0.649 | 0.324 | 3.28 | 0.302 | 0.631 | 14.54 |
| Sample 3 | 0.649 | 0.325 | 3.22 | 0.300 | 0.632 | 14.63 |
| Sample 4 | 0.646 | 0.324 | 2.99 | 0.294 | 0.636 | 14.84 |
| Sample 5 | 0.643 | 0.323 | 2.78 | 0.288 | 0.640 | 15.04 |
| Sample 6 | 0.639 | 0.322 | 2.54 | 0.281 | 0.644 | 15.26 |
| Sample 7 | 0.634 | 0.321 | 2.28 | 0.274 | 0.648 | 15.51 |
| Sample 8 | 0.650 | 0.325 | 3.21 | 0.300 | 0.633 | 14.70 |
| Sample a | 0.614 | 0.315 | 1.65 | 0.257 | 0.658 | 16.10 |
| Sample b | 0.626 | 0.319 | 1.98 | 0.266 | 0.653 | 15.79 |

TABLE 2-2

| | chromaticity coordinates of blue | | | White point chromaticity coordinates | | | NTSC | sRGB |
|---|---|---|---|---|---|---|---|---|
| | x | y | Y | x | y | Y | (%) | (%) |
| Sample 1 | 0.157 | 0.064 | 1.92 | 0.291 | 0.312 | 6.59 | 76.1 | 99.1 |
| Sample 2 | 0.157 | 0.062 | 1.97 | 0.285 | 0.305 | 6.60 | 76.5 | 99.2 |
| Sample 3 | 0.157 | 0.064 | 1.97 | 0.285 | 0.309 | 6.60 | 76.7 | 99.4 |
| Sample 4 | 0.156 | 0.063 | 2.05 | 0.274 | 0.304 | 6.63 | 77.6 | 99.7 |
| Sample 5 | 0.155 | 0.062 | 2.12 | 0.265 | 0.299 | 6.65 | 78.3 | 99.7 |
| Sample 6 | 0.154 | 0.061 | 2.20 | 0.255 | 0.295 | 6.67 | 78.9 | 99.6 |
| Sample 7 | 0.153 | 0.060 | 2.29 | 0.244 | 0.290 | 6.69 | 79.4 | 99.1 |
| Sample 8 | 0.157 | 0.067 | 1.93 | 0.289 | 0.321 | 6.61 | 76.6 | 99.4 |
| Sample a | 0.152 | 0.058 | 2.51 | 0.220 | 0.278 | 6.75 | 79.2 | 96.3 |
| Sample b | 0.152 | 0.059 | 2.39 | 0.233 | 0.284 | 6.72 | 79.6 | 98.2 |

The white point chromaticity coordinates (Wx, Wy) of the white light emitted from the light-emitting device is allocated within the following ranges: $0.23<Wx<0.27$, and $0.22<Wy<0.25$. The peak of the transmittance spectrum of the red color filter is between 720 nm and 780 nm, and the intensity of the peak of the transmittance spectrum of the red color filter is between 0.95 and 1. The peak of a transmittance spectrum of the green color filter is between $534\pm2$ nm, and the intensity of the peak of the transmittance spectrum of the green color filter is between 0.88 and 0.91. The peak of a transmittance spectrum of the blue color filter is between $449\pm2$ nm, and the intensity of the peak of the transmittance spectrum of the blue color filter is between 0.83 and 0.87. In the display device of the present invention, the color filters under the specifications defined above are used to cooperate with the light-emitting device under the specifications defined above. The display device may be capable of providing display images having the sRGB color gamut coverage higher than 99% accordingly, and the color reproduction of the display device may be enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A display device, comprising:
    at least one light-emitting device, configured to provide a white light having a white point chromaticity coordinate (Wx, Wy), wherein $0.23<Wx<0.27$, and $0.22<Wy<0.25$; and
    a patterned color filter layer, comprising:
        a red color filter, configured to covert the white light into a red light after the white light passing through the red color filter, wherein a peak of a transmittance spectrum of the red color filter is between 720 nanometers (nm) and 780 nm, and an intensity of the peak of the transmittance spectrum of the red color filter is between 0.95 and 1;
        a green color filter, configured to covert the white light into a green light after the white light passing through the green color filter, wherein a peak of a transmittance spectrum of the green color filter is between $534\pm2$ nm, and an intensity of the peak of the transmittance spectrum of the green color filter is between 0.88 and 0.91; and
        a blue color filter, configured to covert the white light into a blue light after the white light passing through the blue color filter, wherein a peak of a transmittance spectrum of the blue color filter is between $449\pm2$ nm, and an intensity of the peak of the transmittance spectrum of the blue color filter is between 0.83 and 0.87.

2. The display device of claim 1, wherein a spectrum of the white light comprises:
   a blue light spectrum, wherein a peak of the blue light spectrum is substantially between 442 nm and 446 nm, and a full width at half maximum (FWHM) of the peak of the blue light spectrum is substantially between 15 nm and 25 nm;
   a green light spectrum, wherein a peak of the green light spectrum is substantially between 528 nm and 532 nm, and a FWHM of the peak of the green light spectrum is substantially between 65 nm and 85 nm; and
   a red light spectrum, wherein a peak of the red light spectrum is substantially between 628 nm and 632 nm, and a FWHM of the peak of the red light spectrum is substantially between 70 nm and 100 nm.

3. The display device of claim 1, wherein a color gamut of a display image generated by the red light, the green light, and the blue light covers more than 99% of the standard RGB (sRGB) color gamut.

4. The display device of claim 1, wherein the light-emitting device comprises a white light emitting diode (LED) device.

5. The display device of claim 4, wherein the white LED device comprises a blue LED chip and a plurality of yellow phosphor powders.

6. The display device of claim 5, wherein materials of the yellow phosphor powders comprise a silicate base phosphor material.

7. The display device of claim 6, wherein the silicate base phosphor material comprises a mixture of a europium-doped barium-strontium-silicate ($BaSrSiO_4:Eu^{2+}$) and a europium-doped strontium-lithium-silicate ($SrLi_2SiO_4:Eu^{2+}$).

8. The display device of claim 7, wherein a concentration of the $BaSrSiO_4:Eu^{2+}$ in the mixture is substantially between 59% and 73%.

9. The display device of claim 7, wherein a concentration of the $SrLi_2SiO_4:Eu^{2+}$ in the mixture is substantially between 27% and 41%.

10. The display device of claim 1, further comprising a non-self-luminous display panel disposed on the light-emitting device, wherein the patterned color filter layer is disposed in the non-self-luminous display panel.

11. The display device of claim 10, wherein the non-self-luminous display panel comprises a liquid crystal display panel.

* * * * *